United States Patent
Raimarckers et al.

(10) Patent No.: US 11,408,907 B2
(45) Date of Patent: Aug. 9, 2022

(54) TOTAL PRESSURE AND TOTAL TEMPERATURE MEASUREMENT IN A TURBOMACHINE

(71) Applicant: SAFRAN AERO BOOSTERS SA, Herstal (BE)

(72) Inventors: Nicolas Raimarckers, Herstal (BE); Frédéric Vallino, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 258 days.

(21) Appl. No.: 16/784,464

(22) Filed: Feb. 7, 2020

(65) Prior Publication Data
US 2020/0256887 A1  Aug. 13, 2020

(30) Foreign Application Priority Data
Feb. 8, 2019  (BE) .................... 2019/5078

(51) Int. Cl.
*G01M 15/14* (2006.01)
*G01P 5/165* (2006.01)
*F04D 27/00* (2006.01)

(52) U.S. Cl.
CPC ............ *G01P 5/165* (2013.01); *F04D 27/001* (2013.01); *G01M 15/14* (2013.01)

(58) Field of Classification Search
CPC ........ G01P 5/165; F04D 27/001; F04D 19/02; F04D 29/324; F04D 29/542; G01M 15/14; G01M 9/065
See application file for complete search history.

(56) References Cited

U.S. PATENT DOCUMENTS

| 2,750,734 | A | 6/1956 | Anxionnaz et al. |
| 5,508,943 | A | 4/1996 | Batson et al. |
| 6,167,690 | B1 * | 1/2001 | Hepner .................... G05B 5/01 60/39.27 |
| 6,564,628 | B1 * | 5/2003 | Leblond ................. G01C 21/00 73/178 R |
| 2011/0112797 | A1 | 5/2011 | Nuehse et al. |

(Continued)

FOREIGN PATENT DOCUMENTS

| GB | 811854 | 4/1959 |
| JP | S6248999 A | 3/1987 |
| JP | H10132842 A | 5/1998 |

OTHER PUBLICATIONS

Search Report dated Oct. 9, 2019 for BE 201905078.

*Primary Examiner* — Freddie Kirkland, III
(74) *Attorney, Agent, or Firm* — James E. Walton

(57) ABSTRACT

A method of testing and/or controlling the operation of an axial turbomachine through which passes a gas stream, includes the following actions: measurement of operating parameters of the turbomachine, said parameters including pressure in the gas stream at different axial positions, and calculation of operating conditions of the turbomachine from the measured parameters and the Laplace coefficient γ of the gas passing through the turbomachine, wherein the measurement of parameters includes a measurement of the temperature of the gas stream, and the calculation of operating conditions includes a determination of the Laplace coefficient γ on the basis of the measurement of the temperature of the gas stream.

20 Claims, 2 Drawing Sheets

(56) References Cited

U.S. PATENT DOCUMENTS

2012/0048387 A1* 3/2012 Galeotti .............. F04D 27/0223
　　　　　　　　　　　　　　　　　　　137/14
2016/0010495 A1* 1/2016 Mueller ................ F01D 21/003
　　　　　　　　　　　　　　　　　　　701/100

* cited by examiner

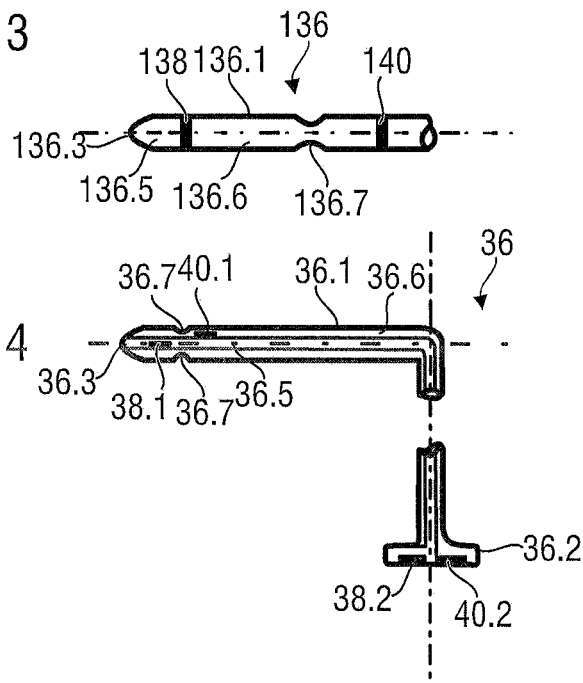
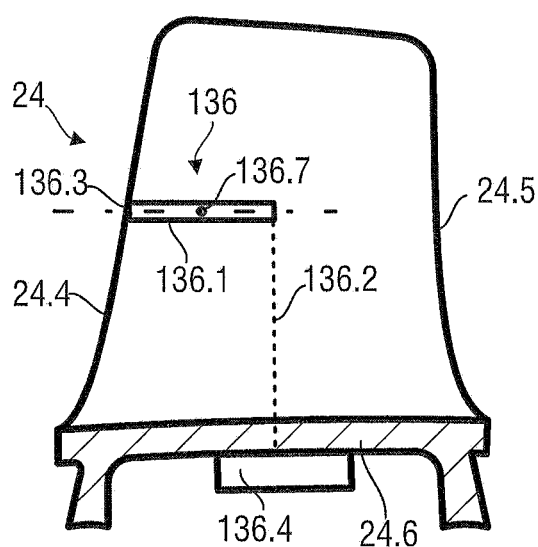
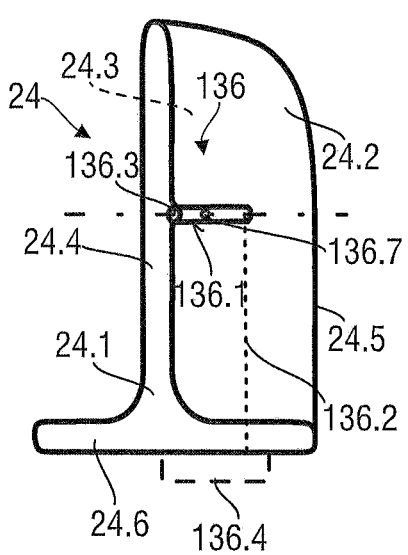

TOTAL PRESSURE AND TOTAL TEMPERATURE MEASUREMENT IN A TURBOMACHINE

This application claims priority under 35 U.S.C. § 119 to Belgium Patent Application No. 2019/5078, filed 8 Feb. 2019, titled "Total Pressure and Total Temperature Measurement in a Turbomachine," which is incorporated herein by reference for all purposes.

BACKGROUND

1. Field of the Application

The present application relates to the field of turbomachinery and more particularly to the field of turbomachine operation control.

2. Description of Related Art

An axial turbomachine generally comprises a compressor, a combustion chamber and a turbine. The latter ensures the setting in motion of the compressor. The compressor consists of alternating rows of stator blades and rotor blades, a row of rotor blades followed by a row of stator blades forming a compression stage. Similarly, a turbine consists of alternating rows of stator blades and rotor blades, a row of stator blades followed by a row of rotor blades forming an expansion stage. From an energy point of view, the row of rotor blades, that is to say mobile, ensures the transfer of energy between the machine and the fluid while the row of stator blades, that is to say fixed, only performs an internal transformation of the energy form of the fluid. Although there are forces between the fluid and the stator blades, these being fixed, they do not work. In the case of the compressor, the row of stator blades located downstream of the row of rotor blades, or moving wheel, is called a rectifier. In the case of the turbine, the row of stator blades located upstream of the moving wheel is called a distributor. The compressor is traversed by air and the turbine is traversed by air and combustion products. In other words, the fluid flowing through the turbomachine is a gas subject to variations in speed and variations in pressure.

The patent document published GB 811,854 discloses an axial turbomachine equipped with a measurement of the difference between the total pressure and the static pressure in a row of stator blades. This measurement is used to control the air flow through the turbomachine. The total pressure is measured by forming a channel in the thickness of the blade, starting from the leading edge. Static pressure is measured at the inner or outer wall of the compressor housing, at the row of stator blades, between two neighboring blades.

The patent document published JP H10132842 A relates to an L-shaped multi-channel Pitot tube capable of being placed between two stator blades of an axial turbomachine. In order to disturb at minimum the gas flow, the end for measuring the total pressure in the gas flow comprises several channels arranged in an essentially circular manner. In the rear part of the Pitot tube, the channels widen to take a configuration where they are side by side in a transverse direction.

The total pressure measurements carried out according to the above teachings fail to allow a detailed determination of the operation of the turbomachine.

Although great strides have been made in the area of operation control of turbomachinery, many shortcomings remain.

DESCRIPTION OF THE DRAWINGS

Certain characteristics and advantages of the present application will be better understood from the description and the drawings, among which:

FIG. 3 is a schematic sectional view of a Pitot tube integrated on one of the blades of the turbomachine of FIGS. 1 and 2.

FIG. 4 is a schematic sectional view of a Pitot tube between two blades of the turbomachine of FIGS. 1 and 2.

FIG. 5 is a side view of a blade (rotor or stator) of the compressor of the turbomachine of FIGS. 1 and 2, showing the integration of a Pitot tube, according to the present application.

FIG. 6 is a front view of the blade (rotor or stator) of FIG. 5.

DETAILED DESCRIPTION OF THE PREFERRED EMBODIMENT

Figure 1:
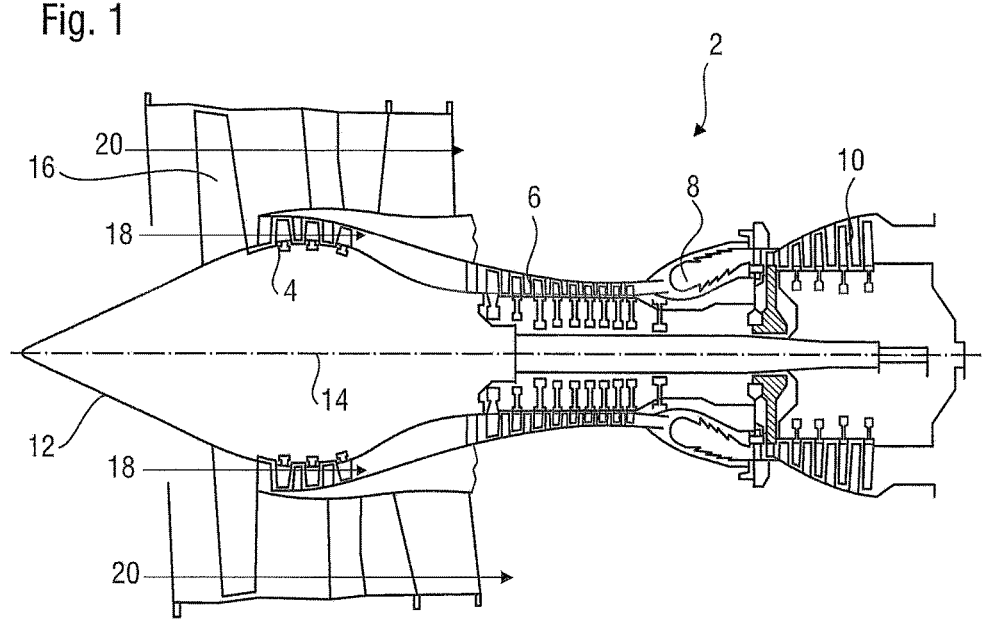
FIG. 1 is a longitudinal sectional view of an axial turbomachine according to the present application.

The present application aims to solve at least one of the problems posed by the prior art. More particularly, the object of the present application is to make it possible to determine the thermodynamic operating conditions of an axial turbomachine, more particularly of a compressor of such a machine.

The present application is a method for testing and/or controlling the operation of an axial turbomachine through which passes a gas stream, comprising the following actions: measurement of operating parameters of the turbomachine, said parameters comprising the pressure in the gas stream at different axial positions; calculation of operating conditions of the turbomachine from the measured parameters and the Laplace coefficient γ of the gas passing through the turbomachine; wherein the measurement of parameters includes a measurement of the temperature of the gas stream; and the calculation of operating conditions comprises a determination of the Laplace coefficient γ on the basis of the measurement of the gas stream temperature.

According to an advantageous embodiment of the present application, the gas stream temperature measurement is carried out in at least one Pitot tube.

According to an advantageous embodiment of the present application, at least one of the pressure measurements is carried out in the at least one Pitot tube.

According to an advantageous embodiment of the present application, the at least one Pitot tube is located inside the turbomachine between two compression stages or between two expansion stages.

According to an advantageous embodiment of the present application, the temperature measurement comprises the static temperature T and the total temperature $T_t$, and the pressure measurement comprises the static pressure p and the total pressure $p_t$, the Laplace coefficient γ being determined by the relation:

$$\frac{p}{p_t} = \left(\frac{T}{T_t}\right)^{\frac{\gamma}{\gamma-1}}$$

According to an advantageous embodiment of the present application, the calculation of operating conditions comprises a calculation of the efficiency $\eta_{c\ stage}$ of a compression stage of the turbomachine according to the relation:

$$\eta_{c\ stage} = \frac{T_{01}\left(\left(\frac{p_{03}}{p_{01}}\right)^{\frac{\gamma-1}{\gamma}} - 1\right)}{T_{03} - T_{01}}$$

where $T_{01}$ is the total temperature measured at the entry of the compression stage, $p_{03}$ is the total pressure measured at the exit of the compression stage, and $p_{01}$ is the pressure measured at the entry of the compression stage.

The present application is also an axial turbomachine compressor, comprising several compression stages, each stage comprising a row of rotor blades capable of accelerating an air stream passing through it, followed by a row of stator blades suitable for rectifying said air stream; and a control unit; wherein the compressor further comprises at least one air stream temperature sensor, located between two compression stages; and in that the control unit is configured to determine the Laplace coefficient $\gamma$ of the air based on the measurement of the air stream temperature.

According to an advantageous embodiment of the present application, the at least one temperature sensor is located in a Pitot tube placed in the fluid stream.

According to an advantageous embodiment of the present application, the compressor comprises an external casing delimiting the air stream and supporting the stator blades, the least one Pitot tube is arranged on an inner face of the casing and between two adjacent stator blades in the same row.

According to an advantageous embodiment of the present application, the at least one Pitot tube is a Prandtl antenna equipped with sensors for measuring the static pressure, the total pressure, the static temperature and the total temperature.

According to an advantageous embodiment of the present application, the static pressure and temperature measurement sensors, and/or the total pressure and temperature measurement sensors are combined on a single component, respectively.

According to an advantageous embodiment of the present application, the Laplace coefficient $\gamma$ is determined by the relation:

$$\frac{p}{p_t} = \left(\frac{T}{T_t}\right)^{\frac{\gamma}{\gamma-1}}$$

where $T$ is the static temperature, $T_t$ the total temperature, and $p$ the static pressure and $p_t$ the total pressure.

According to an advantageous embodiment of the present application, the control unit is configured to calculate an efficiency $\eta_{c\ stage}$ of at least one compression stage of the turbomachine according to the relation:

$$\eta_{c\ stage} = \frac{T_{01}\left(\left(\frac{p_{03}}{p_{01}}\right)^{\frac{\gamma-1}{\gamma}} - 1\right)}{T_{03} - T_{01}}$$

where $T_{01}$ is the total temperature measured at the entry of the compression stage(s), $p_{03}$ is the total pressure measured at the exit of the compression stage(s), and $p_{01}$ is the pressure measured at the entry of the compression stage(s).

The present application also relates to a blade for turbomachine fluid, comprising a body with two aerodynamic faces opposite one another and a leading edge and a trailing edge, said edges connecting the two aerodynamic faces; and a Pitot tube opening at the leading edge; wherein the Pitot tube contains at least one fluid pressure and/or temperature sensor.

According to an advantageous embodiment of the present application, the Pitot tube forms a Prandtl antenna with a first chamber capable of measuring the total pressure and/or temperature of the fluid and a second chamber capable of measuring the static pressure and/or temperature of said fluid.

According to an advantageous embodiment of the present application, the at least one pressure and/or temperature sensor of the fluid comprises a first pressure sensor and a first temperature sensor, both in the first chamber, and a second pressure sensor and a second temperature sensor, both in the second chamber.

According to an advantageous embodiment of the present application, the first pressure sensor and the first temperature sensor are combined on a common substrate, and/or the second pressure sensor and the second temperature sensor are combined on a common substrate.

According to an advantageous embodiment of the present application, the Pitot tube comprises a conduit with an inlet for the fluid, said conduit being inserted in the body.

According to an advantageous embodiment of the present application, the Pitot tube comprises a conduit with an inlet for the fluid, said conduit being formed by the body.

According to an advantageous embodiment of the present application, the body forms a foot and the blade comprises, in addition, a signal transmission unit disposed on said foot and at least one electrical track connecting the at least one pressure and/or fluid temperature sensor at said unit.

In the description which follows, the terms "interior", "internal", "exterior" and "external" refer to a positioning relative to the axis of rotation of an axial turbomachine.

FIG. 1 is a longitudinal sectional view of an axial turbomachine. In this specific case, it is a double-flow turbojet engine. The turbojet engine 2 comprises a first level of compression, called a low-pressure compressor 4, a second level of compression, called a high-pressure compressor 6, a combustion chamber 8 and one or more levels of turbines 10. In operation, the mechanical power from the turbine 10 transmitted via the central shaft to the rotor 12 sets in motion the two compressors 4 and 6. Amplifying means can increase the speed of rotation transmitted to the compressors. The different turbine stages can be connected separately to the compressor stages via concentric shafts. Compressors 4 and 6 have several rows of rotor blades associated with rows of stator blades. The rotation of the rotor around its axis of rotation 14 thus makes it possible to generate an air flow and to compress it progressively until the inlet of the combustion chamber 10.

An inlet fan commonly known as a "turbofan" 16 is coupled to the rotor 12 and generates an air flow which is divided into a primary flow 18 passing through the various above-mentioned levels of the turbomachine, and a secondary flow 20 passing through an annular conduit (partially shown) along the machine to then join the primary flow at the turbine outlet. The primary 18 and secondary 20 flows are annular flows, they are channeled by the turbomachine casing. For this purpose, the casing has cylindrical walls or ferrules which can be internal and external.

Figure 2:
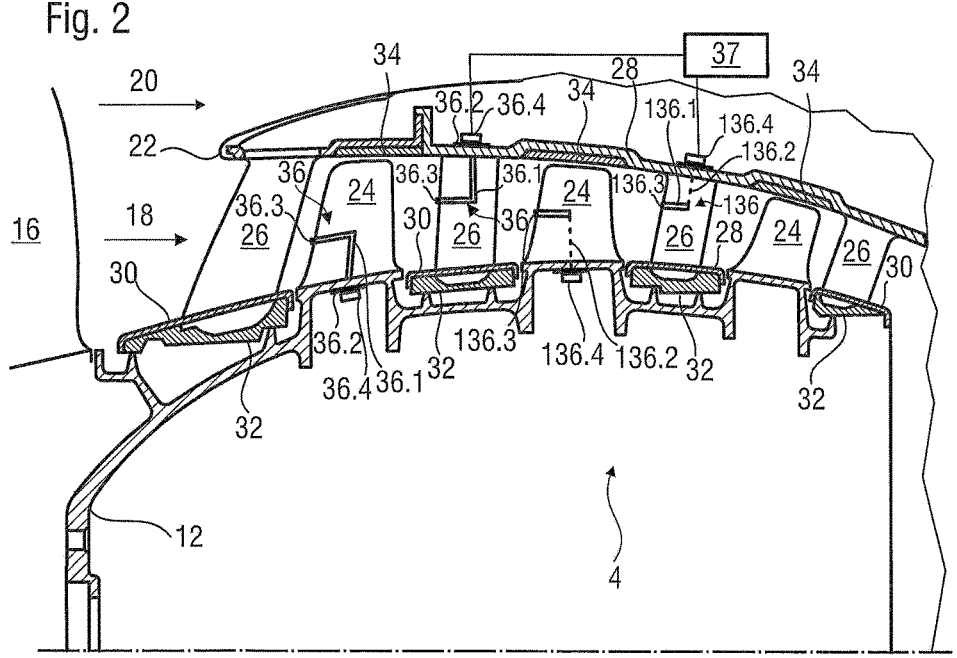
FIG. 2 is a longitudinal sectional view of the low-pressure compressor of the axial turbomachine of FIG. 1, said compressor being in accordance with the present application.

FIG. 2 is a sectional view of a low-pressure compressor 4 of an axial turbomachine 2 such as that of FIG. 1. One can observe therein a portion of the fan 16 and the separation nozzle 22 of the primary flow 18 and of the secondary flow 20. The rotor 12 comprises several rows of rotor blades 24, for example three.

The low-pressure compressor 4 comprises several rectifiers, for example four, where each contains a row of stator blades 26. The rectifiers are associated with the fan 16 or a row of rotor blades 24 to rectify the air flow, in order to convert the velocity of the flow into pressure.

The stator blades 26 extend essentially radially from an external casing 28. They are regularly spaced from one another, and generally have the same angular orientation in the flow.

The rectifiers each include an internal ferrule 30 for guiding the primary flow 18. The ferrules 30 each have an annular row of openings. The latter are distributed homogeneously around the periphery of the internal ferrules and are crossed by the internal ends of the blades in order to fix the ferrule therein. The internal ferrules 30 have a section in the shape of the letter "U", the hollow part of which is oriented inward. The internal ferrules 30 can be made of metal, for example of titanium alloy, or of composite material.

The rectifiers each comprise an annular layer of abradable material 32 housed in the hollow of the internal ferrules 30. The abradable layers 32 can be of substantially constant thickness, so as to form a strip. These abradable layers 32 are intended to cooperate by abrasion with sealing elements or circumferential fins so as to ensure a seal. The layers of abradable material provide filling and can be structuring.

The casing 28 also includes circular grooves filled with abradable material 34 in line with the ends of the rotor blades 24, intended to provide a seal while allowing occasional contact of the blades.

The compressor 4 is made up of several compression stages, each stage comprising a row of rotor blades 24 followed by a row of stator blades 26. The row of rotor blades 24 is commonly called a moving wheel and the row of stator blades 26 is commonly called rectifier or fixed wheel. The moving wheel accelerates the fluid and the rectifier converts part of the speed of the fluid into pressure. A measurement of the pressure and the temperature of the gas stream within a compression stage allows to determine the transformations of fluid which take place there and, consequently, to determine its efficiency. Transformation processes involve the use of the Laplace coefficient γ which is $$\gamma = \frac{C_p}{C_v}$$

where $C_p$ is mass heat at constant pressure and $C_v$ is mass heat at constant temperature. However, the air, in a temperature range from approximately 273° K to approximately 1500° K, can be considered as a real gas whose specific heat at constant pressure $C_p$ only depends on the temperature. Mass heat at constant pressure $C_p$ has an increasing value with temperature, which means that the Laplace coefficient γ has a decreasing value with temperature. The value of the Laplace coefficient γ is close to 1.4 at temperatures between 200° K and 400° K, so that in most calculations it is considered to be constant and the value of 1.4 is used.

However, as will be demonstrated below, certain calculations of operating parameters, such as that of isentropic efficiency, depend significantly on the Laplace coefficient γ.

Indeed, the efficiency of a compression stage $\eta_c$ is:

$$\eta_c = \frac{h_{03is} - h_{01}}{h_{03} - h_{01}}$$

where $h_{01}$ is the stagnation or total enthalpy at the entry of the stage, $h_{03}$ is the stagnation or total enthalpy at the exit of the stage, and $h_{03is}$ is the stagnation or total enthalpy at the exit of the stage in the case of an isentropic transformation, that is to say in the absence of friction. The variations in enthalpy considered here for the calculation of the efficiency correspond to the useful exchanged power, since it is considered that these transformations of fluid in the compressor are adiabatic, that is to say without heat exchange. In an adiabatic transformation, the change in enthalpy is calculated as follows:

$$\Delta H_0 = C_p \Delta T_0 = C_p(T_{03} - T_{01}) = C_p T_{01}\left(\frac{p_{03}}{p_{01}}^{\frac{\gamma-1}{\gamma}} - 1\right).$$

We then obtain $$\eta_c = \frac{T_{03is} - T_{01}}{T_{03} - T_{01}} = \frac{T_{01}\left(\frac{T_{03is}}{T_{01}} - 1\right)}{T_{03} - T_{01}} = \frac{T_{01}\left(\left(\frac{p_{03}}{p_{01}}\right)^{\frac{\gamma-1}{\gamma}} - 1\right)}{T_{03} - T_{01}}$$

If we derive the efficiency $\eta_c$ by the Laplace coefficient γ, we obtain:

$$\frac{d\eta_c}{d\gamma} = \frac{1}{\gamma^2} \frac{T_{01}}{T_{03} - T_{01}} \ln\frac{p_{03}}{p_{01}}\left(\frac{p_{03}}{p_{01}}\right)^{\frac{\gamma-1}{\gamma}}$$

If we consider the following values:

$$T_{01} = 70° \text{ C.}, T_{03} = 180° \text{ C.}, \frac{p_{03}}{p_{01}} = 2.5,$$

we obtain $$\frac{d\eta_c}{d\gamma} = \frac{2.857}{\gamma^2}(2.5)^{\frac{\gamma-1}{\gamma}} \text{ and for } \gamma = 1.4$$

$$\frac{d\eta_c}{d\gamma} = 1.894$$

It is thus noted that the value of the Laplace coefficient γ has a direct and important influence on the calculation of the efficiency of the compression step, namely that a given error of determination of the Laplace coefficient γ will cause an almost double error on the efficiency calculation. It is therefore particularly interesting to measure the total temperature as well as the total pressure of the fluid, in this case air, at the inlet and at the outlet of the compression stage.

It is understood that what has just been detailed above also applies to an expansion stage, with the difference that the efficiency of a turbine stage $$\eta_T = \frac{1}{\eta_c}.$$

It is also understood that what has just been described above also applies to a moving wheel (compression or expansion) and to a fixed wheel (also compression or expansion), in which case the pressure values and total temperatures are measured at the inlet and outlet of said wheel.

In FIG. 2, it can be seen that the first row of rotor blades 24 is equipped with a Pitot tube 36 placed between two neighboring blades. The Pitot tube 36 essentially comprises a body 36.1 in the general form of an elbow or an L, a support 36.2 to which the body 36.1 is fixed and ensuring the attachment of the Pitot tube to the rotor 12. The body 36.1 thus comprises a portion generally extending radially between the two adjacent blades, from the wall of the rotor 12 delimiting the interior surface of the fluid stream, and a portion extending generally axially upstream with respect to the flow of air in the compressor. This axial portion comprises, at its distal and upstream end, an opening or inlet 36.3 intended to be in fluid communication with the air flowing in the compressor 4. With a sensor or several pressure and/or temperature sensors, static pressure, dynamic or total pressure, static temperature and/or dynamic or total temperature can be thus measured. The inlet 36.3 is advantageously disposed axially at the leading edge of the blades 24 of the row of blades in question. It is understood, however, that it is conceivable to provide other axial positions, namely in particular upstream of said leading edge or even downstream. The radial height of the inlet 36.3 can also vary from an internal radial position, that is to say at the level of the blade foot, adjacent to the wall of the rotor 12 delimiting the internal surface of the fluid stream, to an outer radial position, that is to say at the blade ends, adjacent to the wall of the stator 28 delimiting the outer surface of the fluid stream. Advantageously, the inlet 36.3 is located at an intermediate radial position in order to measure the conditions of the air flow at a distance radially from the interior and exterior walls of the fluid stream.

The Pitot tube 36 can also include a signal transmission unit 36.4 advantageously located on the support 36.2. The signals corresponding to the measured values can be transmitted by wire or wirelessly. When the Pitot tube 36 is disposed on the rotor 12, it is advantageous to carry out this wireless transmission because of the difficulty in providing a wired connection to the stator.

Still with reference to FIG. 2, it can be observed that the second row of stator blades 26 is equipped, similarly to the first row of rotor blades 24 detailed above, with a Pitot tube 36. The latter is of construction similar to that of the first row of rotor blades 24, except that it is radially inverted, namely that the body extends radially from the wall of the stator 28 delimiting the external surface of the fluid stream towards the wall of the rotor 12 delimiting the interior surface of the fluid stream. The support 36.2 is then fixed to the wall of the stator 28. The inlet 36.3 is advantageously located axially at the height of the leading edges of the blades 26 in question. This axial position can however vary upstream and/or downstream, in particular so as not to take into account or to take into account certain aerodynamic phenomena manifested at the leading edges in question. As regards the radial position, similar to the Pitot tube arranged in the first row of rotor blades 24 detailed above, it can vary between an external position adjacent to the wall of the stator 28 up to the wall of the rotor 12, it being understood that it is advantageous to provide an intermediate position to avoid taking into account phenomena caused by boundary flow conditions along these walls which are fixed axially with respect to the flow of the fluid stream.

It is interesting to note that the two Pitot tubes 36 which have just been described, namely one with its inlet located axially at the leading edges of the rotor blades 24 and the other with its inlet located axially at the leading edges of the stator blades 26, make it possible to know the conditions of the fluid flow at the inlet and at the outlet of the first row of rotor blades 24. With reference to the discussion made above in relation to the efficiency calculation, it is thus possible by the total pressure and temperature measurements to determine the efficiency not only of a compression stage but also of a fixed or mobile wheel alone, or even of a grouping of stages. It is then necessary to measure the total pressures and temperatures at the inlet and at the outlet of the part of the turbomachine in which one is interested.

Again with reference to FIG. 2, it can be observed that the second row of rotor blades 24 and the third row of stator blades 26 each have a Pitot tube 136 integrated in one of the blades 24 and 26. In fact, as an alternative and/or in addition to the Pitot tube(s) 36 placed between two neighboring blades, a Pitot tube 136 can be integrated in a blade or on a blade. It is indeed conceivable to provide a body forming a conduit 136.1 formed in the thickness of the blade, in particular completely in the thickness or even partially. In the latter case, the conduit may come out from one of the pressure or suction surfaces of the blade 24 and 26. The inlet 136.3 is advantageously at the leading edge of the blade in question. By means of a sensor or several pressure and/or temperature sensors housed in the conduit or at the level of the blade foot in fluid connection with the conduit, static pressure, dynamic or total pressure, static temperature and/or the dynamic or total temperature can be measured in this way. The sensor(s) can be electrically connected by cables or tracks 136.2 to a signal transmission unit 136.4 advantageously located in front of the blade foot.

The construction of the Pitot tubes will be detailed in relation to FIGS. 3 to 6.

FIG. 3 is a detailed view of a Pitot tube 136 integrated in a blade, the blade is not however illustrated. It can be observed that the Pitot tube 136 comprises a body 136.1 forming a conduit with an orifice 136.3 opposite the fluid flow.

A first sensor 138 is arranged in the conduit so as to delimit a first chamber 136.5 in contact with the inlet 136.3. When a fluid flows in the direction of the inlet 136.3, the fluid is decelerated until it stops (approximately) in this first chamber 136.5 so that the entire speed of the fluid is converted into pressure by applying the principle of energy conservation expressed by Bernoulli's law. This compression takes place under conditions comparable to adiabatic conditions, that is to say without heat exchange, which will lead to an increase in its temperature, by application of the principle of the law of ideal gases. In the first chamber 136.5 will then dominate the total pressure and the total temperature of the fluid. The sensor 138 is advantageously a combined sensor able to measure the pressure and the temperature. It can also be two separate sensors placed side by side.

A second sensor 140 is arranged in a second chamber 136.6 located at the rear and downstream of the first chamber 136.5. This chamber is delimited by the second sensor 140 and is open to the outside via the orifice(s) 136.7. This or these are arranged on the longitudinal wall of the conduit, this wall being intended to be oriented parallel to the flow of the fluid. The second chamber is thus in fluid contact with the exterior without converting its kinetic energy into pressure and temperature as in the first chamber 136.5. In the second chamber 136.6 will then dominate the static pressure and the static temperature of the fluid. The Pitot tube thus forms a Prandtl antenna. The sensor 140 is advantageously a combined sensor able to measure the pressure and the temperature. It can also be two separate sensors placed side by side, similar to the first sensor 138.

Electric cables or tracks are then provided to connect the sensors 138 and 140 to a signal transmission unit 136.4 as shown schematically in FIG. 2.

Although the configuration of the Pitot tube of FIG. 3 is illustrated in the context of the configuration integrated into a blade, it is understood, however, that it also applies to the non-integrated configuration, that is to say where the Pitot tube extends between two neighboring blades. In this case, the conduit illustrated in FIG. 3 is carried by the body of the tube. The cables or electrical tracks for connecting the sensors then advantageously pass through a passage formed in the body.

FIG. 4 is a detailed view of a Pitot tube 36 intended to be placed between two neighboring blades. The elongated L-shaped body 36.1, with a portion extending radially (vertically in the figure) and a portion extending axially (horizontally in the figure), forms a double conduit, in this case two concentric conduits.

The first conduit forms a first chamber 36.5 opening outwards to the front through the inlet 36.3. Similar to what has been explained above in relation to FIG. 3, the fluid flowing towards the inlet 36.3 is decelerated in the first chamber and undergoes compression and an increase in temperature there. To this end, a first temperature sensor 38.1 is placed in the first chamber, advantageously near the inlet 36.3 so as to be able to measure the total temperature of the fluid. The first conduit forming a first chamber 36.5 extends along the body 36.1 to the base 36.2 where a first pressure sensor 38.2 can be arranged. This configuration is advantageous in that it makes it possible to measure the temperature as close as possible to the fluid stream while dealing with difficulties of connection of the pressure sensor which may be located further away from the inlet 36.3 without significant loss of precision. It is understood, however, that the two sensors 38.1 and 38.2 may be closer to each other. Thus, the pressure sensor 38.2 can be adjacent to the temperature sensor 38.1 and the inlet 36.3 or the temperature sensor 38.1 can be located at the base, adjacent to the pressure sensor 38.2.

The second conduit forms a second chamber 36.6 surrounding the first chamber 36.5 and opening outwards via the passage(s) 36.7. These have their section essentially aligned with the direction of flow so as not to decelerate the fluid in the chamber in question, in order to measure the pressure and the static temperature, the Pitot tube thus forming a Prandtl antenna. To this end, a second temperature sensor 40.1 is disposed in the second chamber 36.6, adjacent to the orifices 36.7, while a second pressure sensor 40.2 is itself, and similarly to the first pressure sensor 38.2, disposed at the base 36.2 in the second chamber 36.6. This configuration is advantageous in that it makes it possible to measure the temperature as close as possible to the fluid stream while dealing with difficulties of connection of the pressure sensor which may be located further away from the inlet 36.3 without significant loss of precision. It is however understood that the two sensors 40.1 and 40.2 can be arranged side by side.

FIGS. 5 and 6 are two views of a rotor blade 24 as illustrated in FIG. 2, and equipped with an integrated Pitot tube 36, as illustrated in FIG. 3. It is understood that what is presented here in relation to a rotor blade 24 is also valid for a stator blade 26.

The blade 24 comprises a body 24.1 with two aerodynamic faces 24.2 and 24.3 opposite one another and connected to each other by the leading edges 24.4 and 24.5. The two aerodynamic faces 24.2 and 24.3 are commonly called pressure and suction surfaces. The body 24.1 can also form a foot 24.6 of the blade.

It can be observed that the body 36.1 forming the conduit is partially integrated into the thickness of the blade, it being understood that total integration is also possible. In this case, the body 36.1 of the Pitot tube emerges from the pressure surface of the blade, it being understood that it can be disposed on the opposite surface while still in the central position and emerge from each of the pressure and suction surfaces. Electric cables or tracks 36.2 can be embedded in the thickness of the blade or even fixed on at least one of the faces in question of the blade.

In general, the measurement of total and static pressures as well as the measurement of total and static temperatures makes it possible to determine the Laplace coefficient $\gamma$, also called adiabatic coefficient or adiabatic exponent, of the fluid passing through the machine. This coefficient is often assimilated to a constant in the thermodynamic calculations of a turbomachine. However, it varies with temperature, going from approximately from 1.4 at 200° K to 1.3 at 1800° K. Also, these variations can have an important influence on the results of certain calculations such as in particular those of isentropic efficiency, as has been demonstrated above.

We claim:

1. A method for testing and/or controlling the operation of an axial turbomachine through which passes a gas stream, comprising the following actions:
   measurement of operating parameters of the turbomachine, said parameters comprising a pressure in the gas stream at different axial positions;
   calculation of operating conditions of the turbomachine from the measured parameters and a Laplace coefficient $\gamma$ of the gas passing through the turbomachine;
   wherein the measurement of parameters includes a measurement of a temperature of the gas stream; and
   wherein the calculation of operating conditions includes a determination of the Laplace coefficient $\gamma$ on the basis of the temperature measurement of the gas stream.

2. The method according to claim 1, wherein the temperature measurement of the gas stream is carried out in at least one Pitot tube.

3. The method according to claim 2, wherein at least one of the pressure measurements is carried out in the least one Pitot tube.

4. The method according to claim 2, wherein the at least one Pitot tube is located inside the turbomachine between two compression stages or between two expansion stages.

5. The method according to claim 1, wherein the temperature measurement comprises a static temperature T and a total temperature $T_t$, and the pressure measurement comprises a static pressure p and a total pressure $p_t$, the Laplace coefficient $\gamma$ being determined by the relation:

$$\frac{p}{p_t} = \left(\frac{T}{T_t}\right)^{\frac{\gamma}{\gamma-1}}.$$

6. The method according to claim 1, wherein the calculation of operating conditions comprises a calculation of an efficiency $\eta_{c\ stage}$ of a compression stage of the turbomachine according to the relation:

$$\eta_{c\ stage} = \frac{T_{01}\left(\left(\frac{p_{03}}{p_{01}}\right)^{\frac{\gamma-1}{\gamma}} - 1\right)}{T_{03} - T_{01}}$$

where $T_{01}$ is a total temperature measured at the entry of the compression stage, $p_{03}$ is a total pressure measured at the exit of the compression stage, and $p_{01}$ is a pressure measured at the entry of the compression stage.

7. An axial turbomachine compressor, comprising several stages of compression, each stage comprising
a row of rotor blades capable of accelerating an air stream passing through said stage, followed by a row of stator blades capable of rectifying said air stream; and
a control unit,
at least one temperature sensor of the air stream, located between two compression stages; and
the control unit is configured to determine a Laplace coefficient γ of the air based on a measurement of the temperature of the air stream.

8. The axial turbomachine compressor according to claim 7, wherein the at least one temperature sensor is located in a Pitot tube disposed in the air stream.

9. The axial turbomachine compressor according to claim 8, wherein said compressor comprises:
an outer casing delimiting the air stream and supporting the stator blades, the at least one Pitot tube is arranged on an inner face of the casing and between two adjacent stator blades of the same row.

10. Axial turbomachine compressor according to claim 8, wherein the at least one Pitot tube is a Prandtl antenna equipped with sensors to measure static pressure, total pressure, static temperature and total temperature.

11. Axial turbomachine compressor according to claim 10, wherein the static pressure and temperature measurement sensors, and/or the pressure and total temperature measurement sensors are combined on a single component, respectively.

12. The axial turbomachine compressor according to claim 10, wherein the Laplace coefficient γ is determined by the relation:

$$\frac{p}{p_t} = \left(\frac{T}{T_t}\right)^{\frac{\gamma}{\gamma-1}}$$

where T is the static temperature, $T_t$ the total temperature, and p the static pressure and $p_t$ the total pressure.

13. The axial turbomachine compressor according to claim 7, wherein the control unit is configured to calculate an efficiency $\eta_{c\ stage}$ of at least one compression stage of the turbomachine according to the relation:

$$\eta_{c\ stage} = \frac{T_{01}\left(\left(\frac{p_{03}}{p_{01}}\right)^{\frac{\gamma-1}{\gamma}} - 1\right)}{T_{03} - T_{01}}$$

where $T_{01}$ is a total temperature measured at the inlet of the compression stage or stages, $p_{03}$ is a total pressure measured at the outlet of the compression stage or stages, and $p_{01}$ is a pressure measured at the entry of the compression stage or stages.

14. The axial turbomachine compressor according to claim 7, wherein at least one of the blades comprises:
a body with two aerodynamic faces opposite one another and a leading edge and a trailing edge, said leading and trailing edges connecting the two aerodynamic faces; and
a Pitot tube emerging at the level of the leading edge; and
wherein the Pitot tube contains the at least one temperature sensor.

15. The axial turbomachine compressor according to claim 14, wherein the Pitot tube forms a Prandtl antenna with a first chamber capable of measuring a pressure and/or a total temperature of the fluid and a second chamber capable of measuring a pressure and/or a static temperature of said fluid.

16. The axial turbomachine compressor according to claim 15, further comprising:
a first pressure sensor and a first temperature sensor, both in the first chamber, and
a second pressure sensor and a second temperature sensor, both in the second chamber.

17. The axial turbomachine compressor according to claim 16, wherein the first pressure sensor and the first temperature sensor are combined and/or the second pressure sensor and the second temperature sensor are combined on a common substrate, respectively.

18. The axial turbomachine compressor according to claim 14, wherein the Pitot tube comprises:
a conduit with an inlet for the fluid, said conduit being inserted in the body.

19. The axial turbomachine compressor according to claim 14, wherein the Pitot tube comprises:
a conduit with an inlet for the fluid, said conduit being formed by the body.

20. The axial turbomachine compressor according to claim 14, wherein the body forms a foot and the blade further comprises:
a signal transmission unit arranged on said foot and
at least one electrical track connecting the at least one temperature sensor of the fluid to said unit.

* * * * *